(12) United States Patent
Li et al.

(10) Patent No.: US 9,832,765 B2
(45) Date of Patent: Nov. 28, 2017

(54) METHOD FOR CONTROLLING MULTIMODE RADIO COMMUNICATIONS SYSTEM, CONTROL SERVER AND TERMINAL

(71) Applicant: Huawei Technologies Co., Ltd., Shenzhen, Guangdong (CN)

(72) Inventors: Hantao Li, Beijing (CN); Min Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 370 days.

(21) Appl. No.: 14/470,625

(22) Filed: Aug. 27, 2014

(65) Prior Publication Data
US 2014/0378143 A1 Dec. 25, 2014

Related U.S. Application Data

(63) Continuation of application No. PCT/CN2013/071902, filed on Feb. 26, 2013.

(30) Foreign Application Priority Data

Feb. 29, 2012 (CN) .......................... 2012 1 0050093

(51) Int. Cl.
*H04W 36/00* (2009.01)
*H04W 72/04* (2009.01)
(Continued)

(52) U.S. Cl.
CPC ......... *H04W 72/042* (2013.01); *H04W 24/08* (2013.01); *H04W 36/0066* (2013.01);
(Continued)

(58) Field of Classification Search
None
See application file for complete search history.

(56) References Cited

U.S. PATENT DOCUMENTS 6,091,955 A * 7/2000 Aalto .................... H04W 36/20
455/444
2003/0148777 A1 8/2003 Watanabe et al.
(Continued)

FOREIGN PATENT DOCUMENTS

CN 101001447 A 7/2007
CN 101207900 A 6/2008
(Continued)

*Primary Examiner* — Suhail Khan
(74) *Attorney, Agent, or Firm* — Leydig, Voit & Mayer, Ltd.

(57) ABSTRACT

Embodiments of the present invention provide a method for controlling a multimode radio communications system, a control server, and a terminal. The method includes: establishing, by the control server, a basic link between the terminal and any one communications system in the multimode radio communications system according to first settings; selecting, by the control server according to second settings, a communications system from the multimode radio communications system as a service communications system for transmission of each service of the terminal; and sending, by the control server, control information to the terminal on the basic link, where the control information is used to indicate the service communications system for transmission of each service of the terminal. The embodiments of the present invention improve a utilization rate of radio resources and user experience in a multimode radio communications environment.

10 Claims, 10 Drawing Sheets

(51) Int. Cl.
*H04W 24/08* (2009.01)
*H04W 48/18* (2009.01)
*H04W 76/02* (2009.01)
*H04W 68/12* (2009.01)
*H04W 88/06* (2009.01)

(52) U.S. Cl.
CPC ....... *H04W 48/18* (2013.01); *H04W 72/0413* (2013.01); *H04W 76/026* (2013.01); *H04W 68/12* (2013.01); *H04W 88/06* (2013.01)

(56) References Cited

U.S. PATENT DOCUMENTS

| | | |
|---|---|---|
| 2005/0136898 A1 | 6/2005 | Shaheen et al. |
| 2005/0281218 A1 | 12/2005 | Maillard et al. |
| 2007/0146475 A1 | 6/2007 | Inoue |
| 2009/0207772 A1* | 8/2009 | Ehara .................. H04B 7/2606 370/312 |
| 2009/0303917 A1 | 12/2009 | Nakata |
| 2010/0062800 A1 | 3/2010 | Gupta et al. |
| 2011/0305220 A1 | 12/2011 | Lindoff et al. |
| 2011/0319073 A1 | 12/2011 | Ekici et al. |
| 2012/0020248 A1 | 1/2012 | Granlund et al. |
| 2012/0214495 A1* | 8/2012 | Choi ................. H04W 36/0055 455/444 |

FOREIGN PATENT DOCUMENTS

| | | |
|---|---|---|
| CN | 101640913 A | 2/2010 |
| CN | 102098135 A | 6/2011 |
| EP | 1708526 A1 | 4/2006 |
| EP | 16202633.0-1505 | 8/2017 |
| JP | 2000134260 A | 5/2000 |
| JP | 2003284117 A | 10/2003 |
| JP | 2004349976 A | 12/2004 |
| JP | 2006033818 A | 2/2006 |
| JP | 2007027904 A | 1/2007 |
| JP | 2007515142 A | 7/2007 |
| JP | 2007529130 A | 10/2007 |
| JP | 2009124500 A | 6/2009 |
| JP | 2010263576 A | 11/2010 |
| WO | WO 2005051029 A1 | 6/2005 |
| WO | WO 2005060294 A1 | 6/2005 |
| WO | WO 2008096702 A1 | 8/2008 |
| WO | WO 2012006832 A1 | 1/2012 |

\* cited by examiner

METHOD FOR CONTROLLING MULTIMODE RADIO COMMUNICATIONS SYSTEM, CONTROL SERVER AND TERMINAL

CROSS-REFERENCE TO RELATED APPLICATIONS

This application is a continuation of International Patent Application No. PCT/CN2013/071902, filed on Feb. 26, 2013, which claims priority to Chinese Patent Application No. 201210050093.X, filed on Feb. 29, 2012, both of which are hereby incorporated by reference in their entireties.

TECHNICAL FIELD

The present invention relates to the field of mobile communications technologies, and in particular, to a method for controlling a multimode radio communications system, a control server, and a terminal.

BACKGROUND

An existing mobile communications system includes various radio networks, and each radio access technology has its own characteristics in aspects such as capacity, coverage, data rates, and mobility support capabilities. With continuous evolution of existing radio access technologies, new radio access technologies are emerging. They complement or overlap each other, or are integrated. At present, various solutions to consolidating multimode radio communications systems are emerging one after another. The solutions to consolidating multimode radio systems provide uniform radio services for users.

In the prior art, when a multimode terminal uses different services, a gateway on a core network side distributes service data to different radio communications systems according to service features, which, however, leads to a low utilization rate of radio resources of the multimode radio communications systems.

SUMMARY

Embodiments of the present invention provide a method for controlling a multimode radio communications system, a control server, and a terminal to improve a utilization rate of radio resources of a multimode radio communications system and user experience.

According to one aspect, an embodiment of the present invention provides a method for controlling a multimode radio communications system, including:

establishing, by a control server, a basic link between a terminal and any one communications system in the multimode radio communications system according to first settings;

selecting, by the control server according to second settings, a communications system from the multimode radio communications system as a service communications system for transmission of each service of the terminal; and sending, by the control server, control information to the terminal on the basic link, where the control information is used to indicate the service communications system for transmission of each service of the terminal.

An embodiment of the present invention further provides a method for controlling a multimode radio communications system, including:

receiving, by a terminal on a basic link, control information sent by a control server, where the control information is used to indicate a service communications system for transmission of each service of the terminal, the basic link is established between the terminal and any one communications system in the multimode radio communications system, and the service communications system for transmission of each service of the terminal is selected by the control server from the multimode radio communications system; and establishing and/or releasing, by the terminal, a corresponding link for each service according to the service communications system indicated in the control information.

According to another aspect, an embodiment of the present invention further provides a control server, including:

a processor, configured to establish a basic link between a terminal and any one communications system in a multimode radio communications system according to first settings; and select, according to second settings, a communications system from the multimode radio communications system as a service communications system for transmission of each service of the terminal; and a transceiver, configured to send control information to the terminal on the basic link, where the control information is used to indicate the service communications system for transmission of each service of the terminal.

According to still another aspect, the present invention further provides a terminal, including:

a transceiver, configured to receive, on a basic link, control information sent by a control server, where the control information is used to indicate a service communications system for transmission of each service of the terminal, the basic link is established between the terminal and any one communications system in a multimode radio communications system, and the service communications system for transmission of each service of the terminal is selected by the control server from the multimode radio communications system; and a processor, configured to establish and/or release a corresponding link for each service according to the service communications system indicated in the control information.

According to the method for controlling a multimode radio communications system, the control server and the terminal provided in the embodiments of the present invention, a control server deployed on a radio access network side first establishes a basic link between a terminal and a communications system, and then sends control information to the terminal on the basic link, so as to control the terminal to establish or release a corresponding link according to a service communications system determined by the control server for each service, thereby improving a utilization rate of radio resources and user experience in a multimode radio communications environment.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings according to these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
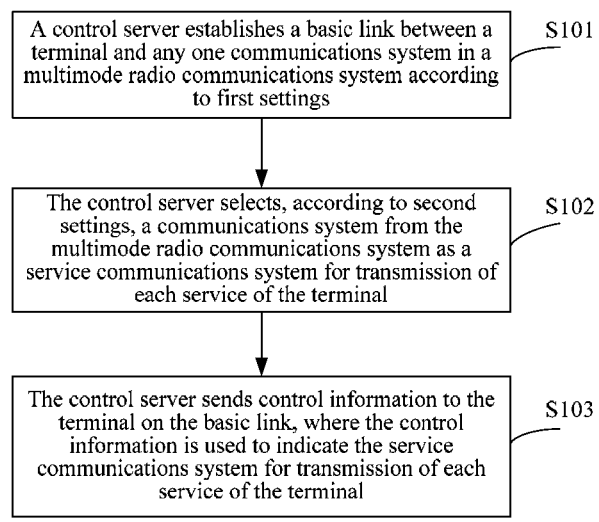
FIG. 1 is a flowchart illustrating an embodiment of a method for controlling a multimode radio communications system according to the present invention.

FIG. 1 is a flowchart illustrating an embodiment of a method for controlling a multimode radio communications system according to the present invention. As shown in FIG. 1, the method includes:

S101. A control server establishes a basic link between a terminal and any one communications system in a multimode radio communications system according to first settings.

S102. The control server selects, according to second settings, a communications system from the multimode radio communications system as a service communications system for transmission of each service of the terminal.

S103. The control server sends, on the basic link, control information to the terminal, where the control information is used to indicate the service communications system for transmission of each service of the terminal.

The foregoing steps are performed by a control server (MI RADIO Control Server), which may be a device that is independently deployed on a radio access network (RAN) side, or may be integrated with another device on a radio access network side, namely, may be a functional module of another device on the radio access network side, where the another device includes an evolved NodeB (eNodeB), or a radio network controller (RNC), or the like. The control server may provide an application programming interface (API) for each communications system in the multimode radio communications system on the radio access network side, so as to facilitate transmission control on each communications system.

In this embodiment of the present invention, a multimode radio communications system exists between the terminal and the RAN side, which means that the terminal may use services of one or more radio communications systems simultaneously. The multimode radio communications system may specifically include a Global System for Mobile communications (GSM), Wideband Code Division Multiple Access (WCDMA), Time Division-Synchronous Code Division Multiple Access (TD-SCDMA), Long Term Evolution (LTE), and the like, in the 3rd Generation Partnership Project (3GPP); and may also include non-3GPP systems such as Worldwide Interoperability for Microwave Access (WIMAX), Code Division Multiple Access (CDMA), a wireless local area network (WLAN), Bluetooth, and Zigbee.

The control server deployed on the RAN side may first establish the basic link between the terminal and the any one communications system in the multimode radio communications system according to the first settings. The first settings may include any one of or a combination of the following information: continuous coverage performance of each communications system in the multimode radio communications system, a load condition of each communications system, a service processing capability of the terminal, and an operator policy. That is, the control server may first select an optimal radio communications system in the multimode radio communications system according to the foregoing information, and establish the basic link between the terminal and the radio communications system.

The control server may determine, according to an actual requirement on transmission of services of the terminal, which factor(s) in the first settings serve(s) as a basis for selecting a basic link.

Specifically, continuous coverage performance of each communications system in the multimode radio communications system refers to a capability of a radio communications system to provide seamless and continuous coverage. Preferably, the control server may select a radio communications system with higher coverage performance to establish the basic link. For example, in a dual-mode radio communications system formed by a Universal Mobile Telecommunications System (UMTS) and an LTE, the control server may select the UMTS with higher coverage performance, while in a multimode radio communications system formed by a UMTS, an LTE, a WLAN, and the like, the control server may select the UMTS or the LTE rather than the WLAN or the like that does not support a handover and has low coverage performance.

Because the basic link needs to be used as a control link to carry the control information sent by the control server to the terminal, the basic link needs to remain in an active state during transmission of services of the terminal, which results in a certain amount of overhead being added to the radio communications system. Therefore, when selecting the basic link, the control server needs to take a load condition of the radio communications system into account to ensure that there are available radio resources on the basic link. Moreover, the load condition of each communications system further includes terminal information and other information of a user in a current service area. The load condition of each communications system may be reported by each communications system, or may be acquired by the control server by means of query.

The service processing capability of the terminal may specifically include: whether the terminal supports each communications system in the multimode radio communications system, information about a rate of receiving or sending service data by the terminal, a hardware configuration of the terminal, and the like. During subscription, the service processing capability of the terminal may be reported to a network-side device that stores subscription data, and the control server may query for the service processing capability of the terminal in the network-side device. Alternatively, the terminal may report information about the service processing capability to the control server.

The operator policy may be a policy specified by an operator of each communications system in the multimode radio communications system according to an actual service requirement. For example, a low value-added service may be transmitted by means of WIFI, a voice call or a video call service may be transmitted through a 3G network, and so on.

The control server may further use other information such as link quality of each communications system as the first settings according to an actual requirement, to establish a basic link between the terminal and any one radio communications system in the multimode radio communications system.

It should be noted that in an implementation scenario, if a service is initiated by a network side, the control server deployed on the network side may directly select a communications system in each multimode radio communications system according to the first settings, and establish a basic link between the selected communications system and the terminal.

In another implementation scenario, if a service is initiated by the terminal, the terminal may first establish an initial link to initiate the service to the network side, where the initial link may be a default link between the terminal and the multimode radio communications system (the default link may be a link of a specific radio communications system and is agreed upon beforehand by the terminal and the network side and is used as an initial link when the terminal initiates a service), or may be a basic link established between the terminal and the multimode radio system during a most recent service transmission. The terminal may report information about the service processing capability of the terminal to the control server by using the initial link. The control server may select a basic link according to the first settings, and then determine whether the selected basic link and the initial link are links of a same radio communications system. If yes, the control server may use the initial link as the basic link and send control information to the terminal by using this link, so as to control transmission of services of the terminal; and if no, the control server may initiate a handover from the initial link to the basic link.

A process of establishing the basic link between the terminal and any one radio communications system in the multimode radio communications system may be implemented according to the prior art, and may specifically include a Packet Data Protocol (PDP) connection and a radio resource control (RRC) connection.

After the basic link is established between the terminal and any one radio communications system in the multimode radio communications system, the control server may determine, according to the second settings, which service communications system in all service communications systems is used for transmitting each service of the terminal. The service communications system mentioned in this embodiment of the present invention is a communications system for carrying terminal services. The service communications system may be a communications system corresponding to the basic link or another communications system. The service communications system may include a communications system, or may include a variety of communications systems.

Similarly, the control server may determine, according to an actual requirement on transmission of services of the terminal, which factor(s) in the second settings serve(s) as a basis for selecting a service communications system. The second settings may include any one of or a combination of the following information: a service requirement of the terminal, a load condition of each communications system in the multimode radio communications system, link quality of each communications system, an operator policy, and a user policy.

The service requirement of the terminal may include: service attributes such as a service type, which may specifically include Hypertext Transport Protocol (HTTP), File Transfer Protocol (FTP), streaming, and the like; and quality of service (QOS) requirements, which may specifically include a delay, a bit error rate, a bit rate, and the like. For example, a video call of a mobile terminal needs to be transmitted in a 3GPP communications system, and a video file of the terminal needs to be transmitted in a WiFi communications mode.

The link quality of each communications system may be detected and reported by the terminal to the control server. For example, the terminal may receive a pilot signal of each communications system, and determine the link quality of each communications system according to strength of the pilot signal. The terminal may also measure the link quality of each communications system in other conventional manners, and this embodiment is not intended to list these conventional manners in an exhaustively manner. The terminal may report the detected link quality of each communications system to the control server on the basic link. Or, a network device in each communications system, such as a base station in LTE or an access point in WiFi, may measure the link quality of each communications system and report the link quality to the control server. According to an actual requirement, the control server may further use other information as the second settings to determine a service communications system for each service of the terminal.

The user policy may include: preferentially selecting WIFI or LTE or the like for a low value-added service. The terminal may report the service requirement of the terminal and the user policy to the control server by using the basic link.

The operator policy may be that, for example, in a multimode radio communications system formed by WLAN and 3G, a service with a large data size and a low QoS requirement may be carried by the WLAN; and in a multimode radio communications system formed by GSM and LTE, a service of a large data amount may be carried by the LTE, and a voice service may be carried by the GSM or a UMTS.

The control server may send control information to the terminal on the basic link established between the terminal and the multimode radio communications system, where the control information is used to indicate a service communications system for carrying each service of the terminal. After receiving the control information sent by the control server, the terminal may correspondingly establish or release a link according to the service communications system selected by the control server for each service.

It should be noted that the basic link established between the terminal and the multimode radio communications system remains in a connected state as far as possible during transmission of each service of the terminal. In this way, the control server is able to send the control information to the terminal on the basic link, or the terminal is able to report, by using the basic link, information such as the service processing capability of the terminal, the user policy, and the link quality of each communications system measured by the terminal to the control server so that the control server is able to select the service communications system for the terminal according to the information. That is, according to this embodiment of the present invention, in the multimode radio communications system, the control server sends the control information to the terminal on the basic link established between the terminal and the multimode radio communications system, so that the control server on the RAN side is able to control the terminal to perform service transmission by using various radio communications systems.

Optionally, a connection on the basic link between the control server and the terminal may be carried on a data radio bearer (DRB) as a special data service (as a high-priority service), or may be carried on a signaling radio bearer (SRB) as a type of signaling, or may be transmitted on a specific physical channel as a special service.

In the method for controlling a multimode radio communications system according to this embodiment of the present invention, a control server deployed on a radio access network side first establishes a basic link between a terminal and a communications system, and then sends control information to the terminal on the basic link, so as to control the terminal to establish or release a corresponding link according to a service communications system selected by the control server for each service, thereby improving a utilization rate of radio resources and user experience in a multimode radio communications environment.

Figure 2:
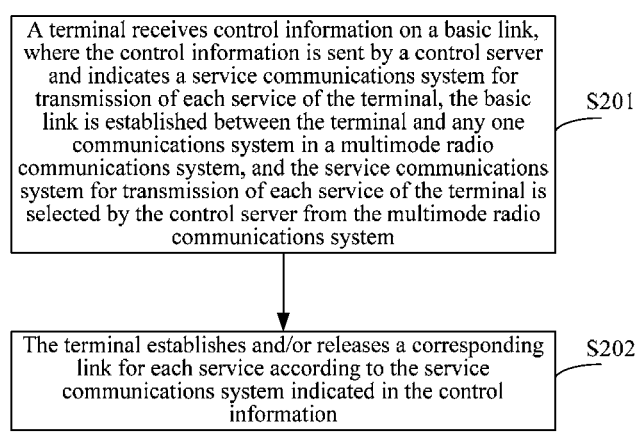
FIG. 2 is a flowchart illustrating another embodiment of a method for controlling a multimode radio communications system according to the present invention.

FIG. 2 is a flowchart illustrating another embodiment of a method for controlling a multimode radio communications system according to the present invention. As shown in FIG. 2, the method includes:

S201. A terminal receives, on a basic link, control information sent by a control server, where the control information is used to indicate a service communications system for transmission of each service of the terminal, the basic link is established between the terminal and any one communications system in a multimode radio communications system, and the service communications system for transmission of each service of the terminal is selected by the control server from the multimode radio communications system.

S202. The terminal establishes and/or releases a corresponding link for each service according to the service communications system indicated in the control information.

The foregoing steps are performed by the terminal, which may be a user equipment (UE) such as a mobile phone, a data card, or a PAD. A client (MI RADIO Client) may be set on the terminal to interact with the control server on a RAN side.

In a feasible implementation, if a service between the terminal and a network side is initiated by the network side, the control server on the network side may directly select a communications system in the multimode radio communications system according to first settings, and establish a basic link between the terminal and the communications system. The first settings may include any one of or a combination of the following information: continuous coverage performance of each communications system in the multimode radio communications system, a load condition of each communications system, a service processing capability of the terminal, and an operator policy. That is, the control server may first select an optimal link between the terminal and the multimode radio communications system as a basic link according to the foregoing information.

In another feasible implementation, if a service between the terminal and the network side is initiated by the terminal, the terminal may first establish an initial link to initiate the service to the network side, where the initial link may be a default link between the terminal and the multimode radio communications system, or may be a basic link established between the terminal and the multimode radio system during a most recent service transmission. The terminal may report information about the service processing capability of the terminal to the control server by using the initial link. The control server may select a basic link according to the first settings, and then determine whether the selected basic link and the initial link are links of a same radio communications system; if yes, the control server may use the initial link as a basic link and send control information to the terminal by using this link to control transmission of services of the terminal; and if no, the control server may initiate a handover from the initial link to the basic link.

After the basic link is established between the terminal and the multimode radio communications system, the control server may select, according to second settings, a communications system from the multimode radio communications system as a service communications system for transmission of each service of the terminal. The second settings may include any one of or a combination of the following information: a service requirement of the terminal, a load condition of each communications system in the multimode radio communications system, link quality of each communications system, an operator policy, and a user policy. According to an actual requirement, the control server may further use other information as the second settings to select a communications system from the multimode radio communications system as a service communications system for transmission of each service of the terminal.

The control server may send control information to the terminal on the basic link established between the terminal and the multimode radio communications system, where the control information is used to indicate a service communications system for transmission of each service of the terminal.

After receiving the control information from the control server on the basic link, the terminal may correspondingly establish or release a link according to the service communications system selected by the control server for transmission of each service.

In the method for controlling a multimode radio communications system provided in this embodiment of the present invention, a control server deployed on a radio access network side sends control information to a terminal on a basic link between the terminal and the RAN side, and the terminal establishes or releases a corresponding link according to a service communications system of each service which is indicated in the control information sent by the control server, thereby improving a utilization rate of radio resources and user experience in a multimode radio communications environment.

Figure 3A:
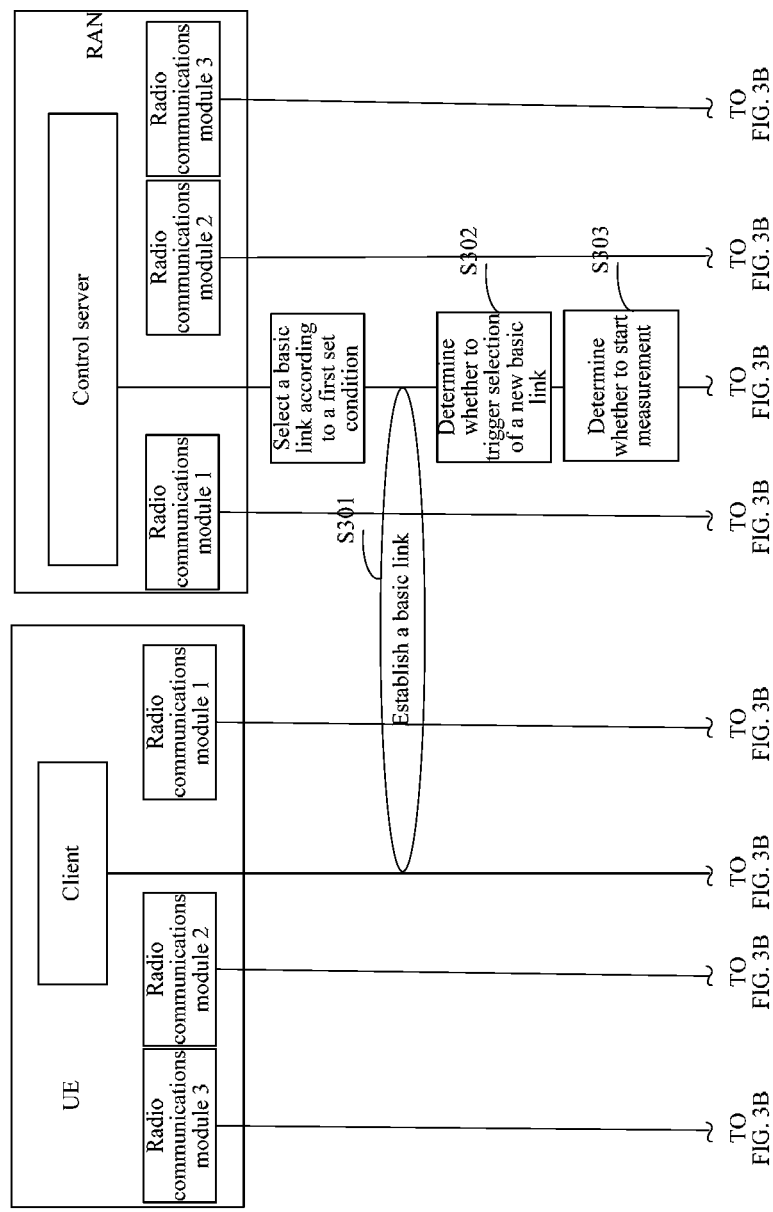
FIG. 3A and FIG. 3B and FIG. 3C are a flowchart illustrating an embodiment for establishing a basic link and updating the basic link according to the present invention.
Figure 3B:
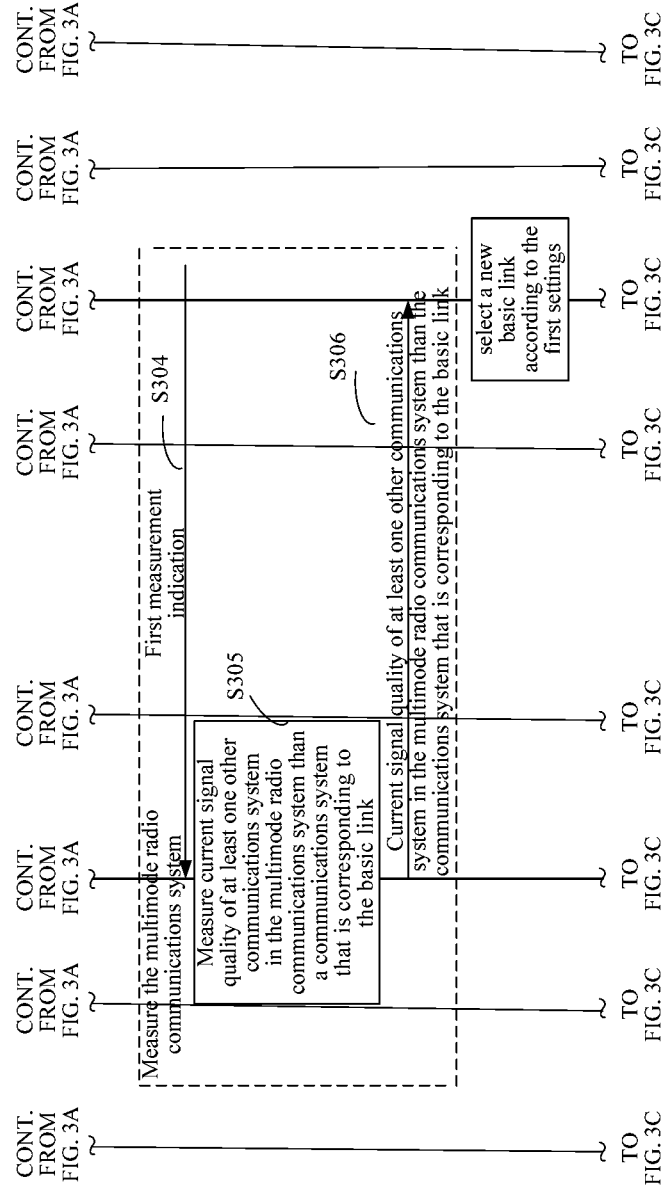
Figure 3C:
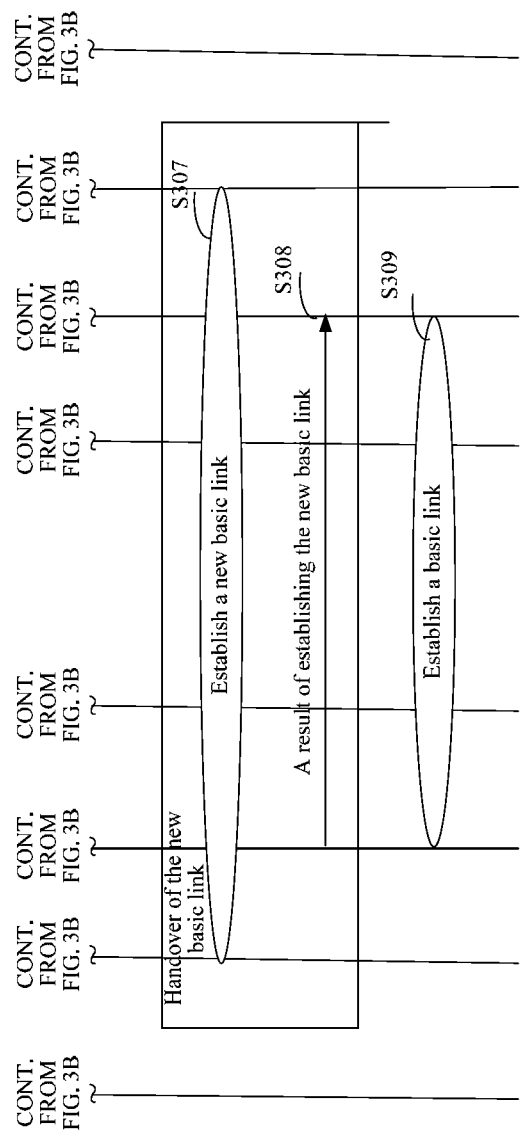

The foregoing embodiments describe the method for controlling a multimode radio communications system according to the present invention from perspectives of a control server on a RAN side and a terminal separately. The following provides an embodiment for establishing a basic link and updating the basic link in the method for controlling a multimode radio communications system. As shown in FIG. 3A and FIG. 3B and FIG. 3C, the procedure for establishing and updating a basic link includes the following steps:

In the embodiment shown in FIG. 3A and FIG. 3B and FIG. 3C, a terminal includes multiple radio communications modules, and each radio communications module may be configured to establish a connection to a communications system in the multimode radio communications system through a corresponding radio communications module (which may be a network device) on a RAN side. For ease of description, in this embodiment, each radio communications module of the terminal and a corresponding radio communications module on the RAN side have a same identifier. For example, both are radio communications module 1 or radio communications module 2 or the like.

S301. According to first settings, a control server deployed on a network side selects a radio communications system in a multimode radio communications system, and establishes a basic link between a terminal and the radio communications system.

A basic link is established between a radio communications module 1 in the terminal and a radio communications module 1 on the RAN side, where the basic link is an initial basic link.

The first settings may include: continuous coverage performance of each communications system in the multimode radio communications system, a load condition of each communications system, a service processing capability of the terminal, and an operator policy.

For all kinds of information included in the first settings, reference may be made to the related description in the foregoing embodiments, and details are not described herein again.

It should be noted that if a service between the terminal and the multimode radio communications system is initiated by the network side, the control server on the network side may directly establish a basic link between the terminal and any one communications system in the multimode radio communications system according to the first settings; or, if a service between the terminal and the network side is initiated by the terminal, the terminal may first establish an initial link to the multimode radio communications system, where the initial link may be a default link between the terminal and the multimode radio communications system or may be a basic link established between the terminal and the multimode radio system during a most recent service transmission. The terminal may report information about the service processing capability of the terminal to the control server by using the initial link. The control server may select a basic link according to the first settings, and then determine whether the selected basic link and the initial link are links of a same radio communications system; if yes, the control server may use the initial link as a basic link and send control information to the terminal by using this link to control transmission of services of the terminal; and if no, the control server may initiate a handover from the initial link to the basic link.

S302. The control server determines whether to trigger selection of a new basic link. If yes, S303 may be performed; otherwise, the procedure is ended or the control server may further perform S302 again after an interval of time.

After the basic link is established between the terminal and the multimode radio communications system, the terminal may detect the basic link in real time, and report detected link quality of the basic link to the control server.

The terminal may report the link quality of the basic link to the control server by using the basic link, or a network device corresponding to the basic link may report the link quality of the basic link to the control server.

The control server may determine, according to an actual requirement on transmission of services of the terminal, which factor(s) in the first settings serve(s) as a basis for selecting a basic link. If the link quality of the basic link does not meet the first settings, the control server may trigger establishment of a new basic link between the terminal and any one communications system in the multimode radio communications system. The settings may be determined by the control server according to an actual transmission condition.

S303. After the selection of a new basic link is triggered, the control server may determine whether to start measurement of current signal quality of at least one other communications system in the multimode radio communications system than the communications system that is corresponding to the basic link. If the measurement will not be started, the procedure skips to S307; if the measurement will be started, the procedure continues with S304.

Specifically, if the link between the terminal and the service communications system has been established and the selection of a new basic link needs to be triggered during transmission of services of the terminal, the control server may determine whether to use a non-basic link except the initial basic link as a basic link. Specifically, the terminal may first determine whether a link in the service communications system may be selected from non-basic links as a candidate basic link; if yes, the control server may not trigger measurement of the current signal quality of at least one other communications system in the multimode radio communications system than the communications system that is corresponding to the basic link; if a link in the service communications system cannot be used as a basic link, the control server may trigger measurement of the current signal quality of at least one other communications system in the multimode radio communications system than the communications system that is corresponding to the basic link.

It should be noted that if the control server uses a link between the terminal and the service communications system as a new basic link, the new basic link between the terminal and the multimode radio communications system may be established according to the first settings in a manner similar to the manner of establishing the initial basic link.

S304. The control server sends a first measurement indication to the terminal, where the first measurement indication is used as an indication of measuring current signal quality of at least one other communications system in the multimode radio communications system than the communications system that is corresponding to the basic link.

In a feasible implementation, the first measurement indication may carry cell information of one or more other cells that are associated with the current service communications system and specified by the control server, where the cell information may be information such as a cell ID or a frequency channel number. The terminal may measure signal quality of a corresponding cell according to the cell information. The one or more other cells associated with the current service communications system may be one or more cells for transmitting terminal services in the current service communications system.

S305. The terminal measures current signal quality of at least one other communications system in the multimode radio communications system than the communications system that is corresponding to the basic link.

Corresponding to S304, the terminal may measure signal quality of one or more corresponding cells according to cell information of one or more other cells that coordinate with the current service communications system, where the cell information is added by the control server in the first measurement indication.

S306. The terminal reports, to the control server, the current signal quality of at least one other communications system in the multimode radio communications system than the communications system that is corresponding to the basic link.

S307. The control server establishes a new basic link between the terminal and any one communications system in the multimode radio communications system according to the first settings.

The basic link newly established in S307 is referred to as a new basic link. As shown in FIG. 3A and FIG. 3B and FIG. 3C, the new basic link is established by radio communications module 2 in the terminal and radio communications module 2 on the RAN side.

S308. The terminal reports a result of establishing the new basic link to the control server.

The terminal may report information such as information about successful establishment of the new basic link and IP address information of the terminal to the control server.

S309. The terminal releases the initial basic link between the terminal and the multimode radio communications system.

The radio communications module 1 of the terminal and the radio communications module 1 on the RAN side perform the operation of releasing the initial basic link.

Figure 4A:
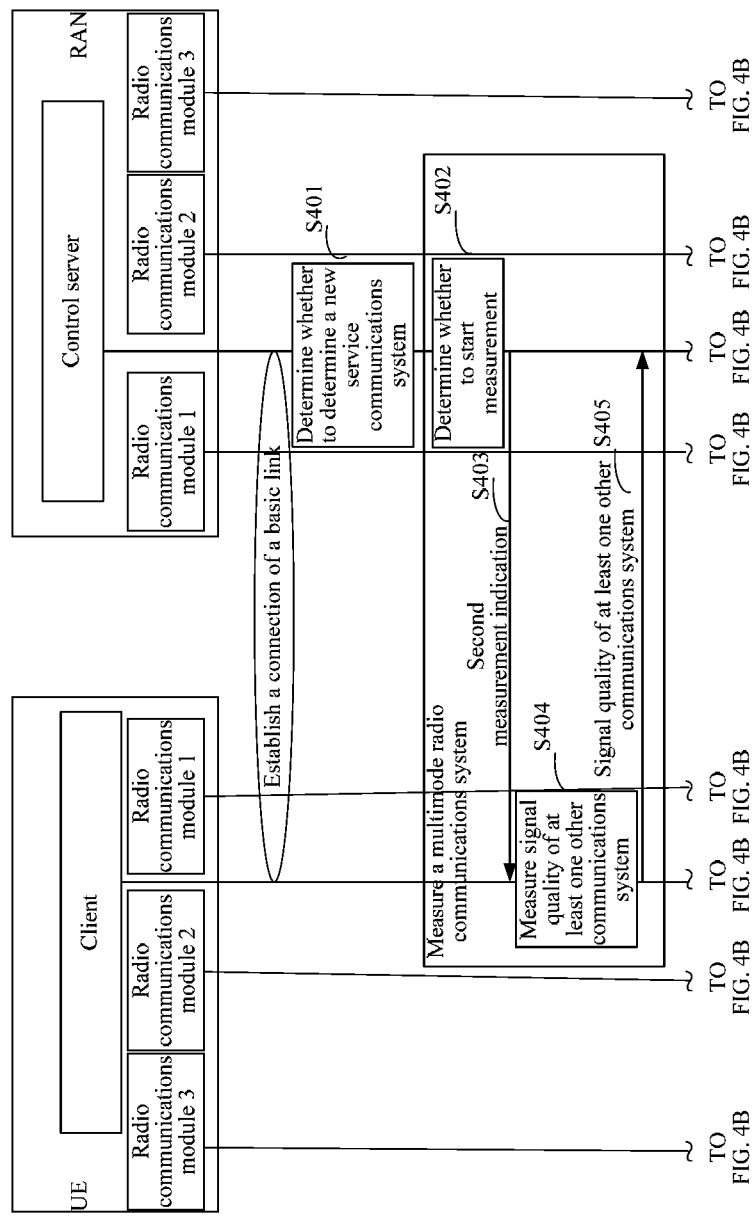
FIG. 4A and FIG. 4B and FIG. 4C are a flowchart illustrating an embodiment for controlling, on a basic link, a terminal to use various communications systems to perform service transmission according to the present invention.
Figure 4B:
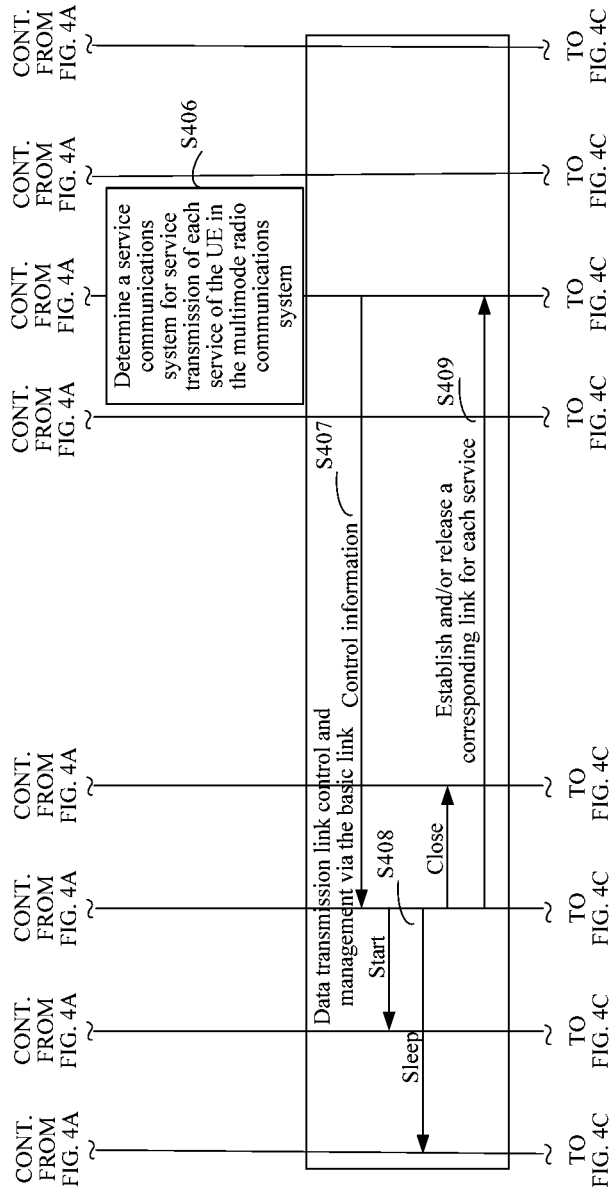
Figure 4C:
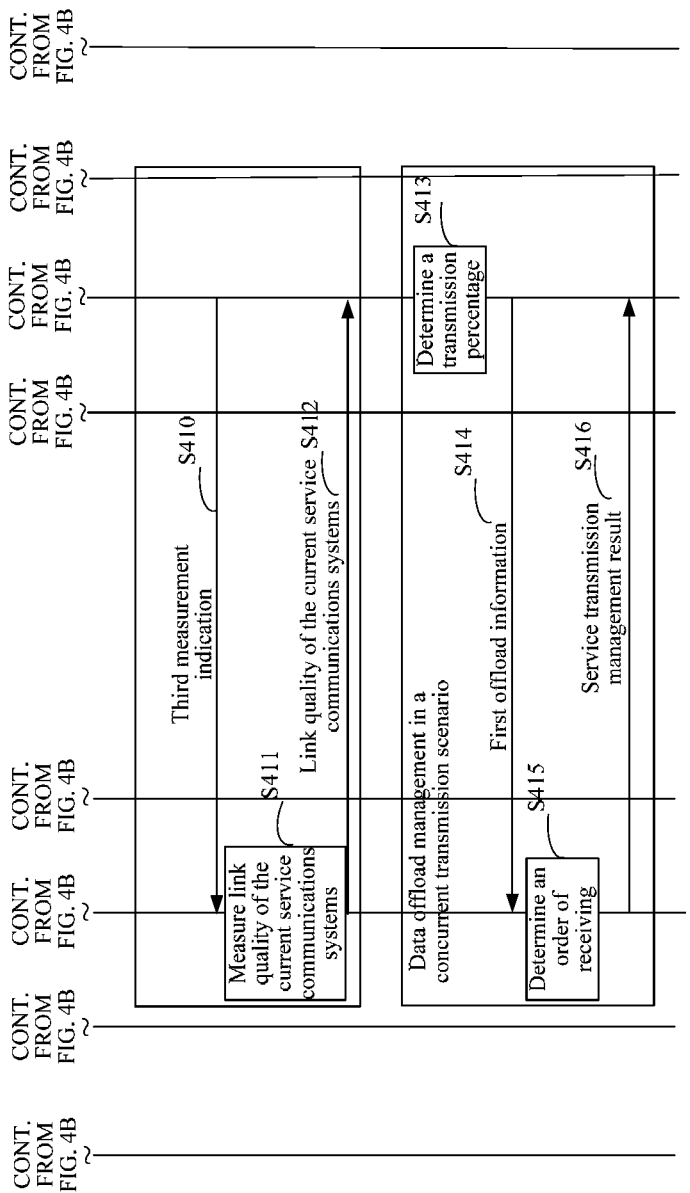

Further, the present invention further provides an embodiment in which a control server controls, on a basic link, a terminal to use various communications systems to perform service transmission after the basic link is established. As shown in FIG. 4A and FIG. 4B and FIG. 4C, the method includes:

S401. The control server determines, according to third settings, whether to select a new service communications system for the terminal, where the third settings includes any one of or a combination of the following information: a traffic volume of the terminal, a load condition of each communications system in a multimode radio communications system, an operator policy, and a user policy. If it is determined to determine a new service communications system for the terminal, S402 is performed; otherwise, S401 is performed again.

For example, when the traffic volume of the terminal exceeds a certain limit or the service communications system is overloaded, or when one or more types of services of the terminal are more suitable for being transmitted in other communications systems, the control server may start management of the multimode radio communications system and determine a new service communications system for transmission of various services of the terminal. The control server may add a service communications system for transmission of a service of the terminal so that the service is transmitted in at least two service communications systems; or the control server may also rule out a service communications system for transmitting a specific service of the terminal.

S402. If there are one or more other communications systems associated with the current service communications system, the control server instructs the terminal to measure signal quality of at least one other communications system in the multimode radio communications system than the current service communications system and the communications system that is corresponding to the basic link.

A communications system associated with the current service communications system may be a communications system that can be used to transmit terminal services in the current service communications system. For example, in a multimode radio communications system formed by a GSM network and a WLAN, it is necessary to determine whether the current GSM network has an associated WLAN access point (Access Point, AP); and, in a UMTS and LTE boosting (boosting) mode, whether the UMTS network has an associated LTE. If there are one or more other communications systems associated with the current service communications system, the terminal may be instructed to measure signal quality of at least one other communications system in the multimode radio communications system than the current service communications system and the communications system that is corresponding to the basic link.

S403. The control server sends a second measurement indication to the terminal, where the second measurement indication is used as an indication of measuring signal quality of at least one other communications system in the multimode radio communications system than the current service communications system and the communications system that is corresponding to the basic link.

S404. According to the second measurement indication, the terminal measures signal quality of at least one other communications system in the multimode radio communications system than the current service communications system and the communications system that is corresponding to the basic link.

S405. The terminal reports, to the control server, signal quality of at least one other communications system in the multimode radio communications system than the current service communications system and the communications system that is corresponding to the basic link.

S406. The control server selects, according to second settings, a communications system from the multimode radio communications system as a service communications system for transmission of each service of the terminal.

The second settings may include any one of or a combination of the following information: a service requirement of the terminal, a load condition of each communications system in the multimode radio communications system, link quality of each communications system, an operator policy, and a user policy.

S407. The control server sends control information to the terminal on the basic link, where the control information is used to indicate the service communications system for transmission of each service of the terminal.

S408. The terminal performs close, start or sleep control on at least one radio communications module according to the service communications system indicated in the control information.

It should be noted that as shown in FIG. 4A and FIG. 4B and FIG. 4C, the terminal generally may include multiple radio communications modules, and each radio communications module may be configured to establish a connection to a communications system in the multimode radio communications system through a corresponding radio communications module (which may be a network device) on a RAN side. For ease of description, in this embodiment, each radio communications module of the terminal and a corresponding radio communications module on the RAN side have a same identifier. For example, both are radio communications module 1 or radio communications module 2 or the like. A basic link is established between a radio communications module 1 in the terminal and a radio communications module 1 on the RAN side.

After receiving the control information sent by the control server on the basic link, the terminal may determine, according to the service radio communications system indicated in the control information, which radio communications module or modules need to be put into use and which radio communications module or modules do not need to be put into use currently. For a radio communications module that needs to be connected to a corresponding radio communications module on the RAN side, the terminal may start the radio communications module, so as to establish a link to the corresponding radio communications system; for a radio communications module that does not need to be put into use currently, the terminal may close the module or control the module to enter a sleep state, thereby reducing power consumption and overheads of the terminal. For example, as shown in FIG. 4A and FIG. 4B and FIG. 4C, after receiving the control information, the terminal starts the radio communications module 2, switches a radio communications module 3 to the sleep state, and closes the radio communications module 1.

In a feasible implementation, according to service usage requirements of the terminal and factors such as a radio communications module corresponding to the service communications system, the terminal may decide which radio communications module or modules are to be closed or which radio communications module or modules will enter the sleep state, and determine a duration for which radio communications module or modules remain in the sleep state. For example, if the service communications system provides no WIFI access, the terminal may close the radio communications module corresponding to the WIFI mode, or switches the radio communications module to the sleep state. A sleep duration may be set to 30 minutes, for example. After the 30 minutes expire, the radio communications module may be started again; or, after the 30 minutes expire, if the service communications system indicated in the control information sent by the control server still provides no WIFI access, the terminal may close the radio communications module corresponding to the WIFI mode. The terminal may determine start, close or sleep of each radio communications module according to a specific implementation scenario.

In another feasible implementation, the control server may instruct the terminal to perform a close, sleep or start operation for a radio communications module according to factors such as a current load condition of the terminal, a service attribute, and user priority. Further, the control server may also indicate, for example, a sleep duration of a radio communications module to the terminal, and the terminal may control the start, sleep or close of the corresponding radio communications module according to the indication of the control server.

S409. The terminal establishes and/or releases a corresponding link for each service according to the service communications system indicated in the control information.

S410 to S412 are optional steps. If any downlink service of the terminal is transmitted in at least two service communications systems, the control server may trigger the terminal or the network devices corresponding to the service communications systems to measure current link quality of the service communications systems, and the control server may determine, according to the current link quality of the service communications systems which is reported by the terminal, a percentage of downlink service data of the terminal transmitted among the at least two service communications systems. Specifically, S410. The control server sends a third measurement indication to the terminal, where the third measurement indication is used as an indication of measuring current link quality of the service communications systems.

In another feasible implementation, the control server may further send the third measurement indication to network devices in the current service communications systems, to instruct the network devices to report current link quality of the service communications systems.

S411. The terminal measures link quality of the service communications systems.

S412. The terminal reports link quality of the service communications systems to the control server.

S413. The control server determines, according to a load condition and/or link quality of the at least two service communications systems, a percentage of downlink service data of the terminal transmitted among the at least two service communications systems.

S414. The control server sends first offload information to the terminal on the basic link, where the first offload information is used to indicate the percentage of downlink service data of the terminal transmitted among the at least two service communications systems.

S415. The terminal determines, according to feature information of the at least two service communications systems, an order of receiving the any one downlink service in the at least two service communications systems.

S416. The terminal reports a result of the service transmission management to the control server.

It should be noted that S413 to S415 are optional steps. Specifically, in a feasible implementation, the feature information of the service communications systems in S415 may include information such as a delay and a bit error rate. The terminal may determine, according to the information such as a delay and a bit error rate of the service communications systems, the order of receiving the downlink service in the at least two service communications systems. In this implementation scenario, S413 to S415 may not be performed, and correspondingly, S410 to S412 may not be performed.

In another feasible implementation, S413 to S415 may be performed, and correspondingly, S410 to S412 may also be performed. That is, the control server may send the first offload information to the terminal, and the terminal may determine, according to the first offload information and the information such as a delay and a bit error rate of the service communications systems, the order of receiving the downlink service in the at least two service communications systems. In this implementation scenario, the feature information of the service communications systems in S415 may include the first offload information and the information such as a delay and a bit error rate of the service communications systems.

S410 to S416 are applicable to an implementation scenario in which the terminal has a downlink service transmitted concurrently in at least two service communications systems. In this implementation scenario, the control server may determine a percentage of downlink service data of the terminal transmitted among the at least two service communications systems, and send first offload information to the terminal. After receiving the first offload information, the terminal may determine, according to the percentage among data indicated in the first offload information and with reference to feature information such as a delay and a bit error rate of the at least two service communications systems, the order of receiving the downlink service in the at least two service communications systems, and receive downlink service data from the network side in the at least two service communications systems according to the order of receiving.

This embodiment further provides an implementation scenario in which the terminal has an uplink service transmitted concurrently in at least two service communications systems. In this implementation scenario, the terminal may determine a percentage of uplink service data of the terminal transmitted among the at least two service communications systems, and send second offload information to the control server. The control server may determine, according to information such as a delay and a bit error rate of the service communications systems, an order of receiving the uplink service in the at least two service communications systems; or the control server may determine, according to the percentage among data indicated in the second offload information and feature information such as a delay and a bit error rate of the at least two service communications systems, an order of receiving the uplink service in the at least two service communications systems, and control the at least two service communications systems to receive the uplink service data from the terminal according to the order of receiving.

Optionally, in a feasible implementation, in a process of service transmission between the terminal and the network side, if any one service communications system to which the terminal is connected has no continuous coverage, the control server may control, outside coverage of the service communications system, the terminal to perform service transmission to the network side by using the basic link, so that the control server can ensure continuous transmission of a terminal service by using the basic link when a link (such as a WLAN) between the terminal and the service communications system has no continuous coverage. When the terminal moves from outside of the coverage of the service communications system to inside the coverage of the service communications system (into a channel service transmission area), the control server may establish a link (such as a WLAN) between the terminal and the service communications system by using the basic link, thereby ensuring service continuity of the terminal.

In another feasible implementation, if the basic link cannot coordinate with a non-basic link in the service communications system (that is, the network device corresponding to the basic link cannot coordinate with the network device corresponding to the non-basic link, for example, sites fail to coordinate), or, if multiple non-basic links exist in the service communications system, the control server may perform a handover of the terminal on the non-basic link with the aid of the basic link, in a mobile communication process of the terminal. For example, the control server may send a cell ID, frequency channel number information and the like of the non-basic link to the terminal by using the basic link. Assuming that a UMTS and an LTE that coordinate with each other exist between the terminal and the network side within a coverage of a current serving cell of the terminal, the terminal performs service transmission by using a link of the UMTS and a link of the LTE. When the terminal enters a coverage of a next serving cell, if the UMTS and the LTE that coordinate with each other do not exist within the coverage of the next serving cell, the control server may use the basic link to assist in controlling the terminal to enter the next cell.

Figure 5A:
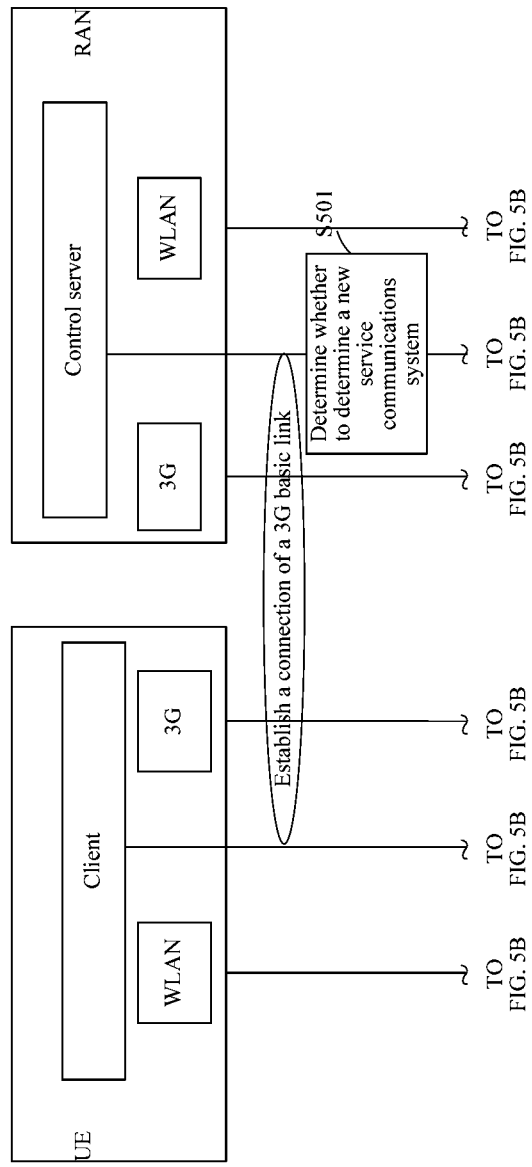
FIG. 5A and FIG. 5B are a flowchart illustrating another embodiment for controlling, on a basic link, a terminal to use various communications systems to perform service transmission according to the present invention.
Figure 5B:
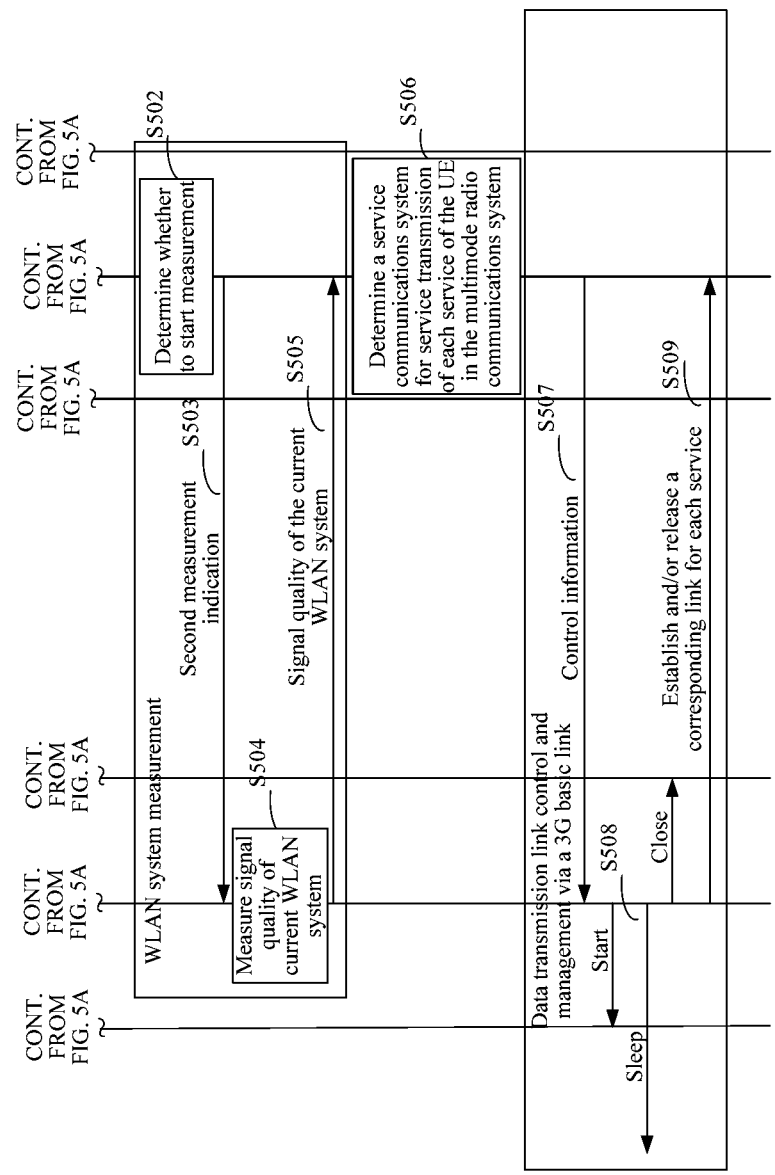

FIG. 5A and FIG. 5B and FIG. 5C show another embodiment in which a control server controls, on a basic link, a terminal to use various communications systems to perform service transmission according to the present invention. As shown in FIG. 5A and FIG. 5B and FIG. 5C, a multimode radio communications system provided in this embodiment is a carrier aggregation network formed by an LTE/UMTS and a WLAN. In this implementation scenario, the method specifically includes:

S501. According to one of or a combination of the following information: a traffic volume of the terminal, a load condition of each communications system in the multimode radio communications system, an operator policy, and a user policy, the control server deployed on a radio access network side determines whether to determine a new service communications system for the terminal in the multimode radio communications system. If it is determined to determine a new service communications system for the terminal, S502 is performed; otherwise, S501 is performed again.

A basic link is a link established between the terminal and the UMTS/LTE. According to a current traffic volume of the terminal, a load condition of each communications system in the multimode radio communications system, an operator policy, and a user policy, the control server determines whether to determine a new service communications system for the terminal in the multimode radio communications system. For example, when the traffic volume of the terminal exceeds a certain limit or the UMTS/LTE is overloaded, or when a service of the terminal is more suitable for being transmitted in a WLAN communications system, the control server may start management of the multimode radio communications system and determine service communications systems for transmission of various services of the terminal.

S502. If there are one or more other communications systems associated with the current service communications system, the control server instructs the terminal to measure signal quality of at least one other communications system in the multimode radio communications system than the current service communications system and the communications system that is corresponding to the basic link.

The control server may check whether an associated WLAN network exists in the current UMTS/LTE mobile communications network; if no, no further processing is required; if yes, S503 is performed.

S503. The control server sends a second measurement indication to the terminal, where the second measurement indication is used as an indication of measuring signal quality of at least one other communications system in the multimode radio communications system than the current service communications system and the communications system that is corresponding to the basic link.

S504. According to the second measurement indication, the terminal measures signal quality of at least one other communications system in the multimode radio communications system than the current service communications system and the communications system that is corresponding to the basic link.

S505. The terminal reports, to the control server, signal quality of at least one other communications system in the multimode radio communications system than the current service communications system and the communications system that is corresponding to the basic link.

S506. The control server selects, according to second settings, a communications system from the multimode radio communications system as a service communications system for transmission of each service of the terminal.

According to any one of or a combination of the following information: a service requirement of the current terminal, a load condition of each communications system in the multimode radio communications system, link quality of each communications system, an operator policy, and a user policy, the control server may determine an optimal resource utilization manner for the terminal, for example, using a WLAN to transmit a service or using multiple communications systems to transmit a service concurrently.

It should be noted that when radio communications systems of two modes exist between the terminal and the network side, such as an LTE/UMTS communications system and a WLAN communications system described in by this embodiment, the control server generally may send control information to the terminal on the basic link, so as to control the terminal to access the WLAN. That is, the operation of S507 may be performed immediately after S501 is performed.

S507. The control server sends control information to the terminal on the basic link, where the control information is used to indicate the service communications system for transmission of each service of the terminal.

The control server may send the control information to the terminal on the basic link of the UMTS/LTE system.

S508. The terminal performs close, start or sleep control on at least one radio communications module according to the service communications system indicated in the control information.

For example, after a 3G link is established as a basic link between the terminal and the RAN side, the control server may decide, according to factors such as network load and terminal service requirements, whether to enable WIFI for offloading, and send the control information to the terminal by using the 3G link.

After receiving the control information, the terminal may perform a corresponding operation of establishing or releasing a link. Specifically, if the control information indicates that transmission is performed only on a 3G link or that a current cell is not bound to a WLAN AP, the terminal may close the WIFI module, so as to resolve a problem of power consumption by the terminal when WIFI is enabled for a long time; if the control information indicates that WIFI will be enabled for offloading, the terminal may start a WIFI module to search for an AP and establish a link; and, if the control information indicates that offloading to WLAN will be temporarily stopped, the terminal may switch the WIFI module to a sleep state.

This embodiment is applicable when one link in a multimode communications system is selected as a basic link for transmitting control information. In this way, resources of multiple types between the terminal and the network in the multimode system may be effectively utilized, and the most effective transmission network and the most effective transmission manner are determined for the terminal, which enhances user experience and significantly reduces power consumption of a multimode multi-standby terminal.

S509. The terminal establishes and/or releases a corresponding link for each service according to the service communications system indicated in the control information.

According to the control information, the terminal starts a WLAN module to search for a corresponding WLAN AP, perform authentication and link establishment, and replies to the network side.

In a feasible implementation, there is no continuous WLAN coverage, and consequently, in an implementation scenario in which the WLAN serves as a service communications system, the control server may perform service transmission by means of the UMTS/LTE when the terminal is outside the coverage of the WLAN, and use a basic link of the UMTS/LTE to complete WLAN network link establishment and service transmission when the terminal enters a coverage area of a new WLAN capable of coordination.

This embodiment is applicable when one link in a multimode communications system is selected as a basic link for transmitting control information, which can effectively deal with uniform management issues such as a handover and concurrent transmission between communications system modes in the multimode radio communications system.

The multimode radio communications system provided in this embodiment is a carrier aggregation network formed by an LTE/UMTS and a WLAN. For terminal service transmission control manners corresponding to other types of multimode radio communications systems such as a multimode radio communications system formed by a UMTS and an LTE, reference may be made to this embodiment.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Figure 6:
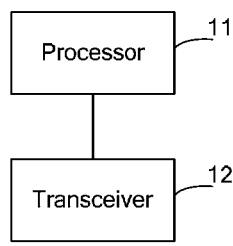
FIG. 6 is a schematic structural diagram illustrating an embodiment of a control server according to the present invention.

FIG. 6 is a schematic structural diagram of an embodiment of a control server according to the present invention. As shown in FIG. 6, the control server includes a processor 11 and a transceiver 12.

The processor 11 is configured to establish a basic link between a terminal and any one communications system in a multimode radio communications system according to first settings; and select, according to a second settings, a communications system from the multimode radio communications system as a service communications system for transmission of each service of the terminal.

The transceiver 12 is configured to send control information to the terminal on the basic link, where the control information is used to indicate the service communications system for transmission of each service of the terminal.

Based on the foregoing embodiments, the present invention further provides another embodiment of the control server. Optionally, the first settings may include any one of or a combination of the following information: continuous coverage performance of each communications system in the multimode radio communications system, a load condition of each communications system, a service processing capability of the terminal, and an operator policy.

Optionally, the second settings may include any one of or a combination of the following information: a service requirement of the terminal, a load condition of each communications system in the multimode radio communications system, link quality of each communications system, an operator policy, and a user policy.

In a feasible implementation, the processor 12 may be further configured to: determine, according to the first settings, to use an initial link, which is established by the terminal, as the basic link; or, initiate a handover from the initial link established by the terminal to the basic link, where the initial link is a default link between the terminal and the multimode radio communications system or a basic link established between the terminal and the multimode radio communications system during a most recent service transmission.

Further, the transceiver 11 may be further configured to receive link quality of the basic link which is reported by the terminal, or receive link quality of the basic link which is reported by a network device corresponding to the basic link.

Correspondingly, the processor 12 may be further configured to: if the link quality of the basic link does not meet settings, establish a new basic link between the terminal and any one communications system in the multimode radio communications system according to the first settings.

Further, the first settings may further include current signal quality of at least one other communications system in the multimode radio communications system than the communications system that is corresponding to the basic link.

Correspondingly, the transceiver 11 may be further configured to send a first measurement indication to the terminal, where the first measurement indication is used as an indication of measuring current signal quality of at least one other communications system in the multimode radio communications system than the communications system that is corresponding to the basic link; and receive the current signal quality of at least one other communications system in the multimode radio communications system than the communications system that is corresponding to the basic link, where the current signal quality is reported by the terminal.

Further, the processor 12 may be further configured to: determine, according to third settings, whether to determine a new service communications system for the terminal, where the third settings include any one of or a combination of the following information: a traffic volume of the terminal, a load condition of each communications system in the multimode radio communications system, an operator policy, and a user policy.

Further, the second settings may further include signal quality of at least one other communications system in the multimode radio communications system than the current service communications system and the communications system that is corresponding to the basic link.

Correspondingly, the transceiver 11 may be further configured to: send a second measurement indication to the terminal, where the second measurement indication is used as an indication of measuring signal quality of at least one other communications system in the multimode radio communications system than the current service communications system and the communications system that is corresponding to the basic link; and receive the signal quality of at least one other communications system in the multimode radio communications system than the current service communications system and the communications system that is corresponding to the basic link, where the signal quality is reported by the terminal.

Optionally, if any one downlink service of the terminal is transmitted in at least two service communications systems, the processor 12 may be further configured to determine, according to a load situation and/or link quality of the at least two service communications systems, a percentage of downlink service data of the terminal transmitted among the at least two service communications systems.

Optionally, the transceiver 11 may be further configured to send first offload information to the terminal on the basic link, where the first offload information is used to indicate the percentage of downlink service data of the terminal transmitted among the at least two service communications systems.

Optionally, the transceiver 11 may be further configured to: send a third measurement indication to the terminal or network devices of the service communications systems, where the third measurement indication is used as an indication of measuring current link quality of the service communications systems; and receive current link quality of the service communications systems that are reported by the terminal or the network devices of the service communications systems.

Optionally, if any one uplink service of the terminal is transmitted in at least two service communications systems, the processor 12 may be further configured to determine, according to feature information of the at least two service communications systems, an order of receiving the any one uplink service of the terminal in the at least two service communications systems, so that a network side receives uplink service data of the terminal in the at least two service communications systems according to the order of receiving.

Optionally, the feature information of the service communications systems may include second offload information, where the second offload information is used to indicate a percentage of uplink service data of the terminal transmitted among the at least two service communications systems.

Correspondingly, the transceiver 11 may be further configured to receive the second offload information sent by the terminal on the basic link.

The control server provided in this embodiment of the present invention is corresponding to the system control method of a multimode radio communications system provided in the embodiments of the present invention, and is a device for executing the system control method of the multimode radio communications system provided in the embodiments of the present invention. For a specific process of executing the system control method of the multimode radio communications system by the control server, reference may be made to the embodiments of the system control method of the multimode radio communications system, and details are not described herein again.

The control server provided in this embodiment of the present invention may be a device that is independently deployed on a radio access network side, or may be integrated with another device on a radio access network side as a functional module in another device on the radio access network side, where another device includes, for example, an eNodeB or an RNC. The control server may provide an API interface for each communications system in the multimode radio communications system on the radio access network side, so as to facilitate transmission control on each communications system.

The control server provided in this embodiment of the present invention establishes a basic link between a terminal and a communications system, and then sends control information to the terminal on the basic link, so as to control the terminal to establish or release a corresponding link according to a service communications system selected by the control server for transmission of each service, thereby improving utilization of radio resources and user experience in a multimode radio communications environment.

Figure 7:
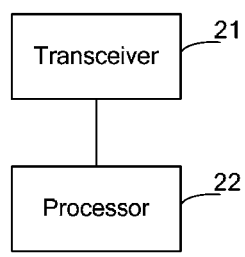
FIG. 7 is a schematic structural diagram illustrating an embodiment of a terminal according to the present invention.

FIG. 7 is a schematic structural diagram of an embodiment of a terminal according to the present invention. As shown in FIG. 7, the terminal includes a transceiver 21 and a processor 22.

The transceiver 21 is configured to receive, on a basic link, control information sent by a control server, where the control information is used to indicate a service communications system for transmission of each service of the terminal, the basic link is established by the control server between the terminal and any one communications system in a multimode radio communications system, and the service communications system for transmission of each service of the terminal is selected by the control server from the multimode radio communications system.

The processor 22 is configured to establish and/or release a corresponding link for each service according to the service communications system indicated in the control information.

Figure 8:
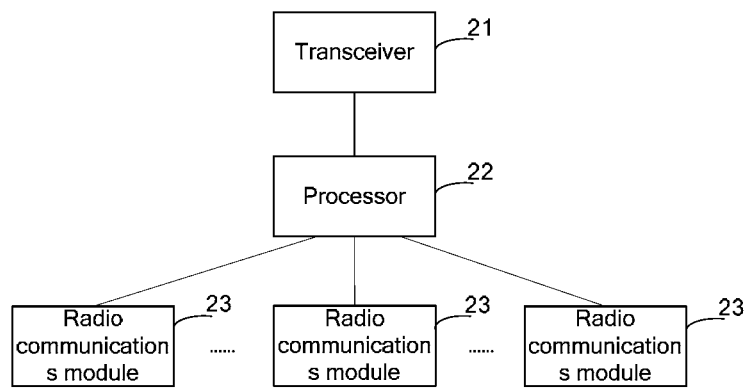
FIG. 8 is a schematic structural diagram illustrating another embodiment of a terminal according to the present invention.

FIG. 8 is a schematic structural diagram of another embodiment of a terminal according to the present invention. As shown in FIG. 8, the terminal includes a transceiver 21, a processor 22 and multiple radio communications modules 23, where each radio communications module is corresponding to one communications system in a multimode radio communications system.

Each radio communications module 23 is configured to establish a link to or release a link between the terminal and a corresponding communications system under control of the processor 22.

Optionally, the processor 22 may be further configured to perform close, start or sleep control on at least one radio communications module 23 according to a service communications system indicated in control information.

In a feasible implementation, the transceiver 21 may be configured to establish an initial link to the multimode radio communications system, where the initial link is a default link between the terminal and the multimode radio communications system or a basic link established between the terminal and the multimode radio communications system during a most recent service transmission.

Further, the processor 22 may be further configured to detect link quality of a basic link.

Correspondingly, the transceiver 21 may be further configured to report the link quality of the basic link to a control server, so that the control server determines whether to establish a new basic link between the terminal and any one communications system in the multimode radio communications system.

Further, the transceiver 21 may be further configured to receive a first measurement indication sent by the control server, where the first measurement indication is used as an indication of measuring current signal quality of at least one other communications system in the multimode radio communications system than a communications system that is corresponding to the basic link.

Correspondingly, the processor 22 may be further configured to measure current signal quality of at least one other communications system in the multimode radio communications system than the communications system that is corresponding to the basic link.

Correspondingly, the transceiver 21 may be further configured to report, to the control server, current signal quality of at least one other communications system in the multimode radio communications system than the communications system that is corresponding to the basic link.

Further, the transceiver 21 may be further configured to receive a second measurement indication sent by the control server, where the second measurement indication is used as an indication of measuring signal quality of at least one other communications system in the multimode radio communications system than the current service communications system and the communications system that is corresponding to the basic link.

The processor 22 may be further configured to measure signal quality of at least one other communications system in the multimode radio communications system than the current service communications system and the communications system that is corresponding to the basic link.

The transceiver 21 may be further configured to report, to the control server, the signal quality of at least one other communications system in the multimode radio communications system than the current service communications system and the communications system that is corresponding to the basic link.

Optionally, if any one downlink service of the terminal is transmitted in at least two service communications systems, the processor 22 may be further configured to determine, according to feature information of the at least two service communications systems, an order of receiving the any one downlink service of the terminal in the at least two service communications systems, and receive downlink service data in the at least two communications systems according to the order of receiving.

Optionally, the feature information of the service communications system includes first offload information, where the first offload information is used to indicate a percentage of downlink service data of the terminal transmitted among the at least two service communications systems.

Correspondingly, the transceiver may be further configured to receive the first offload information sent by the control server.

Optionally, if any one uplink service of the terminal is transmitted in at least two communications systems, the processor 22 may be further configured to determine, according to a load situation and/or link quality of the at least two service communications systems, a percentage of uplink service data of the terminal transmitted among the at least two service communications systems.

The transceiver 21 may be further configured to send second offload information to the control server on the basic link, where the second offload information is used to indicate the percentage of uplink service data of the terminal transmitted among the at least two service communications systems.

The terminal provided in this embodiment of the present invention is corresponding to the system control method of a multimode radio communications system provided in the embodiments of the present invention, and is a device for executing the system control method of the multimode radio communications system provided in the embodiments of the present invention. For a specific process of executing the system control method of the multimode radio communications system by the control server, reference may be made to the embodiments of the system control method of the multimode radio communications system, and details are not described herein again.

The terminal provided in this embodiment of the present invention first establishes a basic link to a communications system, and then receives, on the basic link, control information sent by a control server on a radio access network side, so that the terminal establishes or releases a corresponding link according to a service communications system selected by the control server for transmission of each service, thereby improving utilization of radio resources and user experience in a the multimode radio communications environment.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the spirit and scope of the technical solutions of the embodiments of the present invention.

What is claimed is:

1. A method for controlling a multimode radio communications system, the method comprising:
   establishing, by a control server according to first settings, a control link supported by any one communications system in the multimode radio communications system, where the control link carries control information to the terminal and remains active during transmission of services of the terminal;
   selecting, by the control server according to second settings, communications systems from the multimode radio communications system as service communications systems for transmission of the services of the terminal,
   wherein each of the selected service communications systems is for transmission of one of the services of the terminal; and
   sending, by the control server, the control information to the terminal on the control link, wherein (a) the control information indicates the service communications system for the transmission of each of the services of the terminal so as to control the terminal to establish or release additional links according to the communications systems determined by the control server for supporting the services and (b) the communications system supporting the control link is different from the communications systems supporting the services.

2. The method according to claim 1, wherein establishing the control link comprises one of the following:
   (a) determining, by the control server according to the first settings, to use a first initial link, which is established by the terminal, as the control link; and
   (b) initiating, by the control server, a handover from a second initial link established by the terminal to the control link, wherein the second initial link is (a) a default link between the terminal and the multimode radio communications system or (b) another control link established between the terminal and the multimode radio communications system during a previous service transmission.

3. The method according to claim 1, wherein after establishing the control link, the method further comprises:
   receiving, by the control server, a link quality of the control link from the terminal or from a network device corresponding to the control link; and
   if the link quality of the control link does not meet quality requirements based on the first settings, establishing, by the control server, another control link between the terminal and any one communications system in the multimode radio communications system according to the first settings.

4. The method according to claim 3, wherein the first settings comprise a current signal quality of at least one communications system in the multimode radio communications system other than a communications system supporting the control link; and
   before establishing another control link, the method further comprises:
   sending, by the control server, a first measurement indication to the terminal, wherein the first measurement indication is used as an indication of measuring the current signal quality of the at least one communications system in the multimode radio communications system other than the communications system that corresponds to the control link; and
   receiving, by the control server from the terminal, the current signal quality of the at least one communications system in the multimode radio communications system other than the communications system that supports to the control link.

5. The method according to claim 1, wherein the second settings comprise a signal quality of at least one communications system in the multimode radio communications system other than the communications system that supports the control link; and
   before selecting the service communications systems for transmission of the services of the terminal, the method further comprises:
   sending, by the control server, a second measurement indication to the terminal, wherein the second measurement indication is used as an indication of measuring the signal quality of the at least one communications system in the multimode radio communications system other than the communications system that supports the control link; and
   receiving, by the control server from the terminal, the signal quality of the at least one communications system in the multimode radio communications system other than the communications system that supports the control link.

6. A control server comprising:
   a processor configured to (a) establish, according to first settings, a control link supported by any one communications system in a multimode radio communications system, where the control link carries control information to the terminal and remains in an active state during transmission of services of the terminal and (b) select, according to second settings, communications systems from the multimode radio communications system as service communications systems for transmission of services of the terminal, wherein each of the selected service communications systems is for transmission of one of the services of the terminal; and
   a transceiver configured to send the control information to the terminal on the control link, wherein (a) the control information indicates the service communications system for the transmission of each of the services of the terminal so as to control the terminal to establish or release additional links according to the communications systems determined by the control server for supporting the services and (b) the communications system supporting the control link is different from the communications systems supporting the services.

7. The control server according to claim 6, wherein the processor is further configured to implement one of the following:
   (a) determining, according to the first settings, to use a first initial link, which is established by the terminal, as the control link; and,
   (b) initiating a handover from a second initial link established by the terminal to the control link, wherein the second initial link is (a) a default link between the terminal and the multimode radio communications system or (b) another control link established between the terminal and the multimode radio communications system during previous service transmission.

8. The control server according to claim 6, wherein the transceiver is further configured to receive, from the terminal or a network device corresponding to the control link, a link quality of the control link; and the processor is further configured to establish another link between the terminal and any one communications system in the multimode radio communications system according to the first setting when the link quality of the control link does not meet quality requirements based on the first settings.

9. The control server according to claim 8, wherein the first settings further comprise a current signal quality of at least one communications system in the multimode radio communications system other than a communications system that corresponds to the control link; and the transceiver is further configured to (a) send a first measurement indication to the terminal, wherein the first measurement indication is used as an indication of measuring current signal quality of the at least one communications system in the multimode radio communications system other than the communications system that corresponds to the control link, and (b) receive, from the terminal, the current signal quality of the at least one communications system in the multimode radio communications system other than the communications system that supports to the control.

10. The control server according to claim 6, wherein the second settings comprise a signal quality of at least one communications system in the multimode radio communications system other than the communications system that corresponds to the control link; and the transceiver is further configured to (a) send a second measurement indication to the terminal, wherein the second measurement indication is used as an indication of measuring signal quality of the at least one communications system in the multimode radio communications system other than the current service communications system and the communications system that corresponds to the first basic link; and (b) receive, from the terminal, the signal quality of the at least one communications system in the multimode radio communications system the communications system that supports the control link.

\* \* \* \* \*

UNITED STATES PATENT AND TRADEMARK OFFICE
CERTIFICATE OF CORRECTION

| | |
|---|---|
| PATENT NO. | : 9,832,765 B2 |
| APPLICATION NO. | : 14/470625 |
| DATED | : November 28, 2017 |
| INVENTOR(S) | : Hantao Li et al. |

Page 1 of 1

It is certified that error appears in the above-identified patent and that said Letters Patent is hereby corrected as shown below:

In the Claims

Column 23, Line 11, Claim 1 "to the terminal" should read -- to a terminal --.

Column 23, Line 17, Claim 1 "for transmission" should read -- for the transmission --.

Column 24, Line 33, Claim 6 "to the terminal" should read -- to a terminal --.

Column 24, Line 37, Claim 6 "for transmission of services" should read -- for the transmission of the services --.

Signed and Sealed this
Twelfth Day of June, 2018

Andrei Iancu
*Director of the United States Patent and Trademark Office*